(No Model.)
O. TABER.
SADDLE TREE.
No. 480,219.                    Patented Aug. 2, 1892.
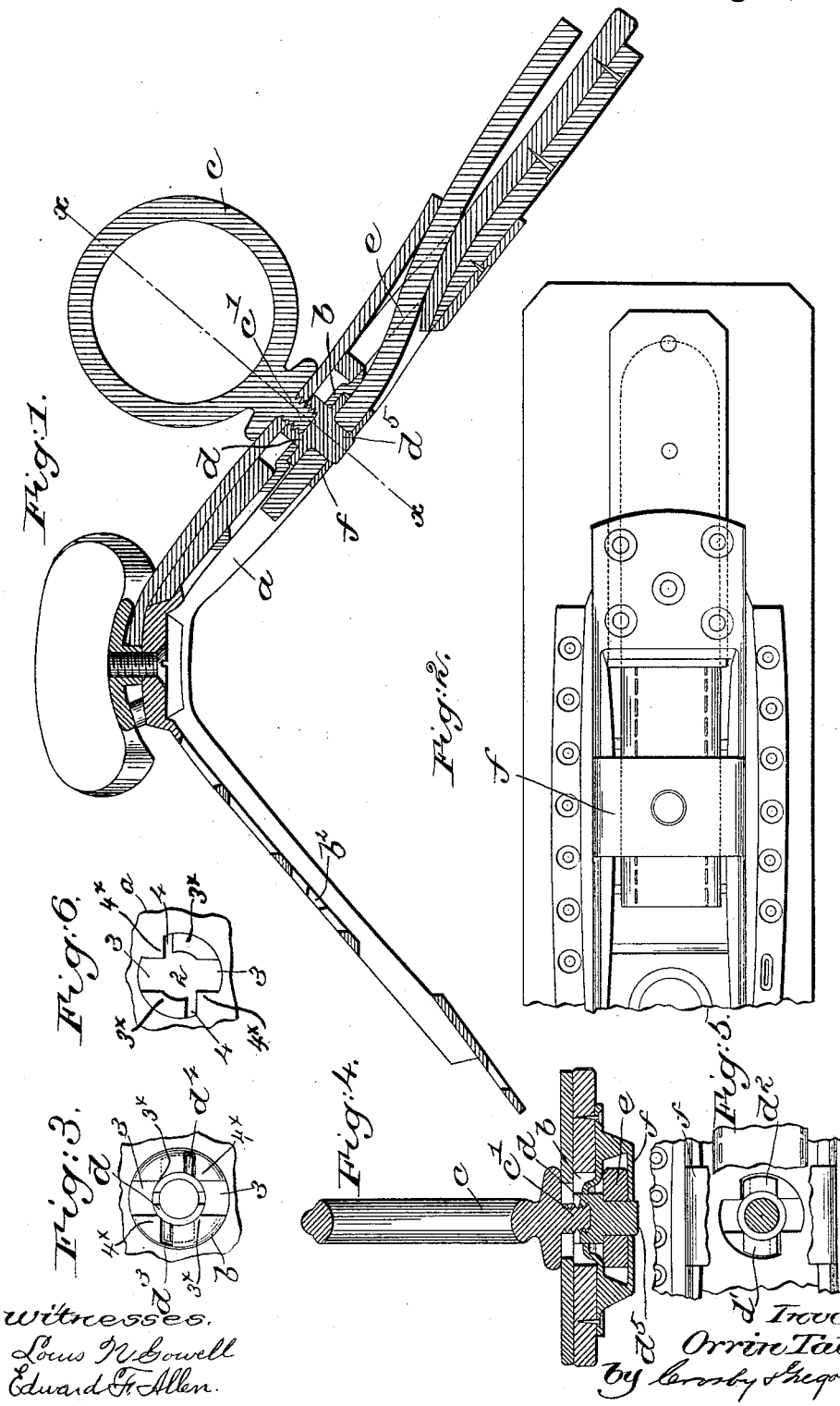
Witnesses.
Louis N. Cowell
Edward F. Allen
Inventor
Orrin Taber
by Crosby & Gregory Attys.

UNITED STATES PATENT OFFICE.

ORRIN TABER, OF NASHUA, NEW HAMPSHIRE, ASSIGNOR TO THE NASHUA SADDLERY HARDWARE COMPANY, OF SAME PLACE.

SADDLE-TREE.

SPECIFICATION forming part of Letters Patent No. 480,219, dated August 2, 1892.

Application filed December 9, 1891. Serial No. 414,475. (No model.)

*To all whom it may concern:*

Be it known that I, ORRIN TABER, of Nashua, county of Hillsborough, State of New Hampshire, have invented an Improvement in Saddle-Trees, of which the following description, in connection with the accompanying drawings, is a specification, like letters and figures on the drawings representing like parts.

Another application, Serial No. 414,474, filed December 9, 1891, shows a saddle-tree with the terret as secured by a suitable locking-nut adapted to be placed in position from the outside of a tree, the tree being recessed to provide a suitable space for the said nut, so that it shall not obstruct the raceway or passage for the running back-band, the said terret-holding nut being held in its locking position or in locking engagement with the tree by the foot of the terret. The tree shown in said application is particularly designed for a running back-band.

This present invention has for its object to provide means for securing the terret and also the lug-strap or back-band in place, said means being adapted to be placed in position and to be operated from the outside of the tree and being also locked in engagement with the tree.

Figure 1 in vertical longitudinal section shows a saddle-tree provided with a single terret and lug-strap, together with means embodying this invention for holding a terret and lug-strap in place. Fig. 2 is an under side view of the right-hand portion of the tree shown in Fig. 1. Fig. 3 is a plan view of the terret-holding nut, viewing it from its upper side and showing it in engagement with the part of the tree which holds the nut. Fig. 4 is a vertical section of the tree and terret and co-operating devices, to be described, taken in the line $x\ x$, Fig. 1. Fig. 5 is an under side view of a portion of the tree, showing the terret-holding nut in engagement therewith, the plate $f$ being omitted; and Fig. 6 is a detail showing the boss part of the saddle-tree with the terret-holding nut removed, said figure being added to represent the shape of the hole made therein.

The saddle-tree $a$, of usual or suitable shape and material, has formed upon it a boss $b$, the under side of which is recessed for the reception of a nut $d$, to be described, the metal of the tree at that part forming the boss being made thin, in order to provide a nut-receiving recess of the proper depth. The tree having this boss $b$ is provided with an irregular hole, the shape of which is best shown in Fig. 6, it showing a substantially circular portion 2, with narrow oppositely-extended openings 4 4 and broader openings 3 3, the portions $3^\times$ of the boss about the hole described occupying a higher level than the portions $4^\times$ of the boss. (Shown best in Figs. 3 and 6.) The terret-holding nut $d$ has a screw-threaded socket portion, into which may be screwed the shank $c'$ of the terret $c$. This threaded end is located in the hole or recess 2, referred to, and the upper end of the nut is extended up through said hole, as best shown in Fig. 1. The terret-holding nut has upon opposite sides lateral projections $d'\ d^2$, and the projections have upwardly-extended shoulders $d^3\ d^4$. The foot of the terret $d^5$, made to represent a pin, is adapted to pass through a hole in the lug-strap $e$ and enter a hole in the plate $f$, the latter aiding in preventing the movement of the nut due to strain therein by the lug-strap. When assembling the parts, the lug-strap $e$ will be placed in position between the plate $f$ and boss $b$, (see Fig. 1,) and thereafter the terret-holding nut $d$ will be passed through the hole 2, the foot $d^5$ extending through the lug-strap and entering a hole in the plate $f$, the openings 3 3 in the base portion of the tree permitting the passage of the projection $d'\ d^2$ of the nut. The terret-holding nut having been placed in this position is then turned for one-quarter of a revolution until its projections $d'\ d^2$ pass over the lips $4^\times$ and thereafter under the lips $3^\times$, and the projections $d^3\ d^4$ abut against the ends of the said lips, as represented in Fig. 3.

With the terret-holding nut put in position, as described in Fig. 3, the shank of the terret will be screwed into the nut firmly.

It is not desired to limit this invention to the exact construction shown for the parts.

I claim—

1. A saddle-tree provided with a hole extended through it and a terret having a screw-threaded shank, combined with a nut threaded at one end to receive the shank of the terret and having a downwardly-extended foot to enter a lug-strap to hold the latter in place, and a support for the foot beyond said strap, substantially as described.

2. A saddle-tree having a boss, as described, cut through to form an opening 2 and shaped to leave a nut-receiving recess at its under side and a fixed plate $f$, combined with a terret-receiving nut contained in said recess and having a foot to pass through the lug-strap and enter a hole in the said plate, substantially as described.

3. A saddle-tree having a hole made through it, having oppositely-extended portions 3 3, combined with a terret-nut having projections $d'$ $d^2$ thereon and adapted to be passed through said hole and its extended portions from its outer side and having a foot extended below said projections to enter a hole in the lug-strap, to operate substantially as described.

4. A saddle-tree having a hole made through it, said hole having passages 3 3 4 4, combined with a terret-nut $d$, having projections $d'$ $d^2$ and shoulders $d^3$ $d^4$, and a foot to enter and hold the lug-strap, substantially as described.

In testimony whereof I have signed my name to this specification in the presence of two subscribing witnesses.

ORRIN TABER.

Witnesses:
BERNICE J. NOYES,
FRANCES M. NOBLE.